(12) United States Patent
Porth et al.

(10) Patent No.: US 6,354,156 B1
(45) Date of Patent: Mar. 12, 2002

(54) TORQUE SENSOR AND METHOD OF PRODUCING A TORQUE-DEPENDENT SIGNAL

(75) Inventors: Wolfgang Porth, Frankfurt; Lother Gier, Bad Nauheim, both of (DE)

(73) Assignee: Mannesmann VDO AG (DE)

( * ) Notice: Subject to any disclaimer, the term of this patent is extended or adjusted under 35 U.S.C. 154(b) by 0 days.

(21) Appl. No.: 09/361,068

(22) Filed: Jul. 26, 1999

(30) Foreign Application Priority Data

Jul. 24, 1998 (DE) ......................... 198 33 357

(51) Int. Cl.$^7$ .............................. G01L 3/00; B25B 23/14
(52) U.S. Cl. ................ 73/862.08; 73/862.24; 73/862
(58) Field of Search ............... 73/862.331, 862.325, 73/862.324, 862.333, 862.332, 862.24, 862, 862.08; 701/48

(56) References Cited

U.S. PATENT DOCUMENTS 4,989,460 A * 2/1991 Mizuno et al. ........ 73/862.333
5,369,583 A * 11/1994 Hazelden ................. 701/48
5,641,916 A * 6/1997 Satoh et al. .......... 73/862.331

OTHER PUBLICATIONS

Patent Abstracts of Japan, JP 03 103737, vol. 15, No. 300, Apr. 30, 1991 (Kubota Corp).

* cited by examiner

*Primary Examiner*—Benjamin R. Fuller
*Assistant Examiner*—Andre Allen
(74) *Attorney, Agent, or Firm*—Robert J. Depke; Mayer, Brown & Platt

(57) ABSTRACT

A torque sensor has a first signal generator whose output signal changes as a function of a torque, a second signal generator whose output signal changes in the opposite direction as a function of the torque, and a circuit which has a difference-forming unit and a summing device. The output signal of each signal generator passes through an amplifier whose gain is controlled and identical for both output signals and the amplified output signals are present on the difference-forming unit and on the summing device the output of the summing device being connected to a controller which controls the gain.

9 Claims, 3 Drawing Sheets

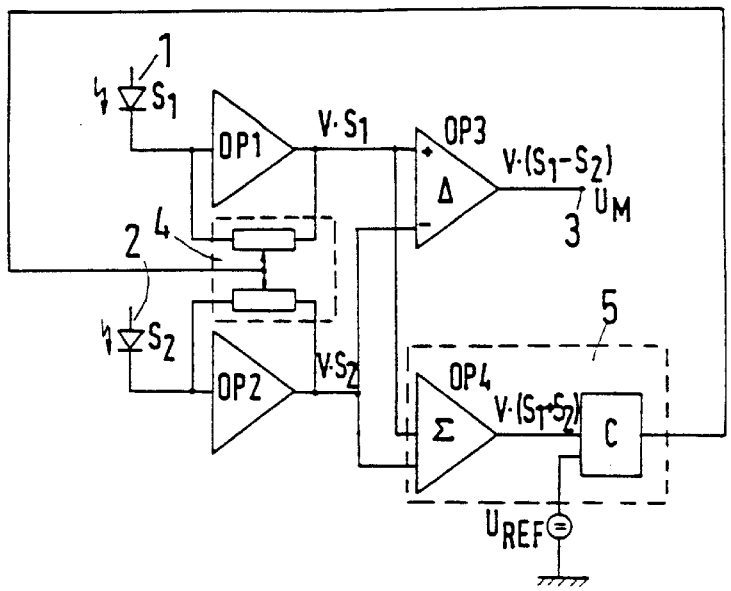
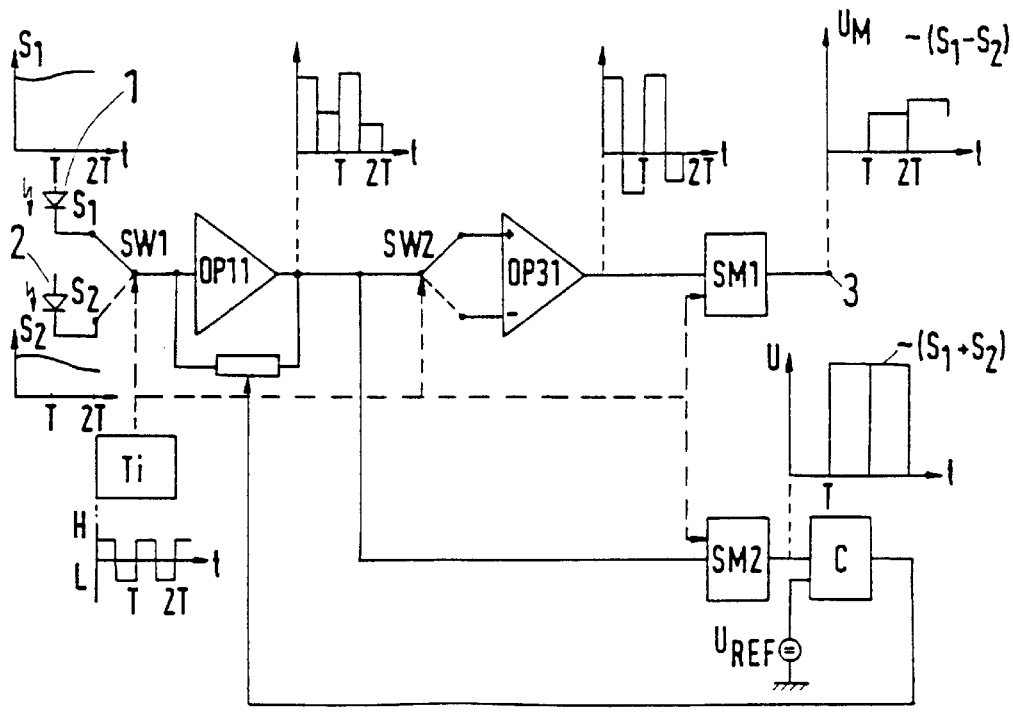

TORQUE SENSOR AND METHOD OF PRODUCING A TORQUE-DEPENDENT SIGNAL

BACKGROUND OF THE INVENTION

1. Field of the Invention

The present invention relates to a torque sensor with a first signal generator, whose output signal changes as a function of a torque, a second signal generator, whose output signal changes in the opposite direction as a function of the torque, and a circuit arrangement which has a difference-forming unit and a summing device. In addition, the invention relates to a method of producing a torque-dependent signal from output signals of two signal generators with opposed signal waveforms.

2. Description of the Related Art

A torque sensor and a method of the type cited at the beginning are disclosed by EP 0 765 795 A2. There, a torque-dependent signal is needed in order to operate power-assisted steering. The torque sensor is arranged on the steering column here and determines when a torque is applied to the steering column. Depending on the torque determined, an additional drive is activated, which moves the steered wheels in such a way that the torque applied to the steering column is minimized. The torque sensor operates with a number of transmission paths which are arranged one after another, are supplied from a transmitter and at whose end the two signal generators are arranged. If a torque is applied in one direction, the output signal from one signal generator increases, and the output signal from the other signal generator decreases. In the case of a torque in the other direction, this sequence is reversed.

In order to prevent changes in the transmission path which have nothing to do with a torque change having a negative influence on the torque signal determined, the sum of the output signals is formed and fed to a controller. The controller then controls the gain of an amplifier which supplies the feed signal for the transmission path, specifically in such a way that the sum of the output signals corresponds to a predefined reference value.

EP 0 555 987 B1 shows a similar arrangement having a torque sensor which, with the aid of a dividing device, divides the difference between the two output signals by their sum, in order to achieve a normalization which, for example, is intended to compensate for aging influences of components.

SUMMARY OF THE INVENTION

The present invention provides a method and structure for easily generating a torque signal. In a torque sensor of the type cited at the beginning, this is achieved by the output signal of each signal generator passing through an amplifier whose gain is controlled and is the same for both output signals, and the amplified output signals being present on the difference-forming unit and on the summing device, the output of the summing device being connected to a controller which controls the gain.

In this configuration, the advantage is that the entire control can be kept within one subassembly. It is therefore no longer necessary to go out outside in order to change the gain of a transmitter. Nevertheless, a torque signal is obtained in a simple way and is largely independent of changes which proceed slowly over time, for example aging phenomena of components. Controlling the gain means that influences of this type are compensated for. Furthermore, the further processing of the output signals becomes somewhat simpler, since said signals are necessarily amplified. Accordingly, the "transmitted power" of a transmitter which effects the output signal in the signal generators can be kept low.

It is preferable for each signal generator to be connected to its own amplifier. This is a very simple possibile implementation. Each output signal can be provided with its own path. The gain can be adjusted by amplifier feedback. Feedback of this type can be changed in a simple way, for example with the aid of a field-effect transistor (FET).

In this case, it is particularly preferred for the gain to be controlled with the aid of a monolithic dual FET. Using the latter, very exact equality of the gains can be achieved, above all if the two amplifiers are also of monolithic construction.

In an alternative configuration, the amplifier is connected to the two signal generators via a changeover switch, the summing device and the difference-forming unit processing consecutive input signals to form sum and difference signals respectively. The only precondition for this is that the time constant of the control of the gain is significantly greater than the changeover period, so that it is possible in each case to process the output signal of the two signal generators with the same gain. This ensures that both output signals are treated identically.

It is preferable if the summing device and the difference-forming unit have a smoothing element, in particular an accurate-phase mean-value rectifier. Since the two output signals, following their amplification, are no longer present simultaneously, but alternately, it must be ensured that they can nonetheless still be processed together. Use is made for this purpose of the smoothing element, in particular a mean-value rectifier operating in phase with the changeover switch. Although the summing device will then no longer receive a signal which corresponds to the sum of the output signals, but a correspondingly smaller signal, for example one half as large, this can be taken into account by appropriate selection of the reference variable. Basically, the sum does not involve absolute values, either. All that is desired to be achieved is that the difference between the output signals is free of undesired interference. When forming the difference, the mean-value rectifier can actually determine a value which corresponds to the difference between the two output signals.

In an alternative configuration, the object is also achieved by the difference-forming unit being connected to the signal input and the summing device being connected to the reference input of an analog/digital converter.

This configuration has the advantage that the torque-dependent measured value is available immediately in digital form, which, for example, makes processing in a microprocessor simpler. The fact that the summing device is connected to the reference input of the A/D converter also means that undesired changes in the overall transmission path are eliminated. The sum signal changes in the same way as the output signals whose difference is considered. If the difference output signals are correspondingly normalized to the sum signal, the desired effect is obtained. In this case, neither a division nor the control of a gain is necessary.

It is also advantageous if the signal generators are each formed by an opto-electronic arrangement having a light source and light receiver, the light source changing its transmitted intensity under cyclic control and provision being made for a switch arrangement each, controlled at the same cycle rate, feeding the output signals of the signal generators from cycles of one intensity, in each case inverted in relation to the output signals from cycles of another intensity, to the summing device and the difference-forming unit. In the case of an opto-electronic arrangement, there may be a series of interfering influences, for example variable dark currents, interfering light or amplifier errors, which can largely be eliminated with the preferred configuration. The output signals of the signal generators each have a "useful component" and an "interference component". The useful component varies with the intensity with which the light source radiates or transmits. The interference component remains the same. Since the transmission behavior of the light source is known, the interference components can be calculated out or filtered out in a simple way. The remaining signal is then the true useful signal.

In this case, it is particularly preferred for the light source not to emit any light in each second cycle. This simplifies the evaluation quite considerably.

In a method of the type cited at the beginning, the object is achieved by the two output signals being amplified with the same gain, and the gain being controlled such that a signal corresponding to the sum of the amplified signals corresponds to a predetermined set point.

As explained above in conjunction with the torque sensor, in the case of this procedure it is possible to remain within one subassembly and nonetheless largely to eliminate the interfering influence of external variables, such that a torque-dependent signal which is largely error-free is produced.

BRIEF DESCRIPTION OF THE INVENTION

The invention will be described in more detail below using preferred exemplary embodiments in conjunction with the drawing, in which:

FIG. 1 shows a schematic illustration of a torque sensor;

FIG. 2 shows a modified embodiment of the torque sensor of FIG. 1;

DETAILED DESCRIPTION OF THE PREFERRED EMBODIMENTS

Figure 3:
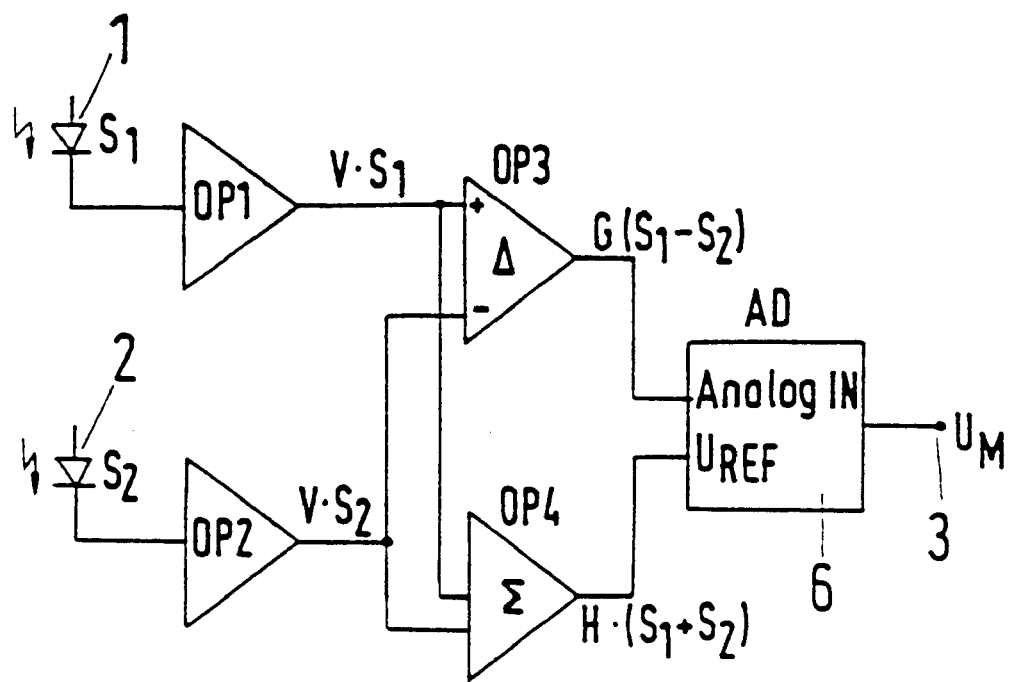
FIG. 3 shows another configuration of a torque sensor.

The mechanical construction of a torque sensor per se is known. For the following description, it will be assumed that the mechanical construction corresponds in principle to that from EP 0 555 987 B1. A steering column has a torsion rod as a measuring shaft. If the steering column has a torque applied to it at the steering wheel, then the measuring shaft twists somewhat. Arranged at one end of the measuring shaft is a plate, which is at right-angles to the longitudinal column. The plate has a light-sensitive region with two areas. Fastened to the other end of the measuring shaft is a sleeve, whose axial length corresponds approximately to that of the measuring shaft. At the end of the sleeve adjacent to the plate, there is a disk with an aperture. An illuminating arrangement, for example a light-emitting diode, is directed through the aperture onto the light-sensitive or photoelectric region. When the measuring shaft twists, the aperture further exposes one photoelectric region and covers the other photoelectric region to a greater extent, so that the output signals of the photoelectric regions change in opposite directions. One signal becomes greater and the other becomes smaller.

The photoelectric regions used may be, for example, two-dimensional dual photodiodes or other two-dimensional photo elements based on semiconductors, for example with center tapping, or corresponding photo transistors or photo resistors. Since these photoelectric elements output a signal, they are referred to in the following text as signal generators. They are illustrated in the drawings as photodiodes.

FIG. 1 shows a circuit arrangement which processes output signals S1, S2 of the two signal generators 1, 2 in such a way that there is available on an output 3 a measuring signal $U_M$ which is proportional to the difference between the two output signals S1, S2 from the two signal generators.

For this purpose, the first signal generator 1 is connected to an amplifier OP1. The signal generator 2 is connected to an amplifier OP2. The two amplifiers have the same gain V. The gain V can be adjusted. To this end, a controllable resistor is illustrated schematically in the feedback of the two amplifiers OP1, OP2. However, this variable gain can also be implemented by a field-effect transistor (FET) being incorporated in each feedback line. Since care must be taken to achieve the most exact equality of the gains, a monolithic dual FET is preferably used. This is illustrated schematically by the two feedback lines being drawn in a common box 4.

The output of the amplifier OP1 is connected to the non-inverting input of a differential amplifier OP3 and to an adder OP4. The output of the second amplifier OP2 is connected to the inverting input of the differential amplifier OP3 and likewise to the adder OP4. The differential amplifier OP3 forms the difference V (S1−S2), and hence makes the measured signal $U_m$ available on its output.

The adder OP4 is connected to a controller C, which acts on the feedback 4 in such a way that the amplified sum signal V×(S1+S2) corresponds to a reference voltage $U_{REF}$. The reference voltage can be produced, for example, with the aid of a Zener diode.

The controller C is preferably constructed as a PI controller. The comparator stage of the controller then compares the actual value V×(S1+S2) with the set point $U_{REF}$ and, depending on the difference between these two values, forms a control signal for the gain of the two amplifiers OP1 and OP2. The gain is ideally set in such a way that the difference between the set point and actual value at the input of the amplifier C becomes zero. The sum signal V (S1+S2) thus remains constant. This ensures normalization of the difference signal occurring on the output of the differential amplifier OP3.

The box 5 indicates that the adder OP4 and the controller C can be implemented by a circuit having a single operational amplifier.

In the configuration according to FIG. 1, each signal generator 1, 2 is connected to its own amplifier OP1, OP2. FIG. 2 now shows a configuration in which only a single amplifier OP11 is provided, and is controlled with the aid of a switch SW1, which is controlled by a clock generator Ti, said configuration processing both output signals S1, S2. Identical parts are provided with the same reference symbols. The corresponding signal waveforms are likewise plotted in FIG. 2. The locations at which the signal waveforms can be determined are indicated by dashed lines.

The clock generator Ti now switches the signal generator 1 and the signal generator 2 alternately to the input of the amplifier OP11. The amplifier OP11 in turn has a controllable gain which, as in FIG. 1, is also represented by a variable resistor in the feedback line. The output of the amplifier OP11 is connected to a second switch SW2, which is likewise controlled by the clock generator Ti. Every time the switch SW1 connects the signal generator S1 to the amplifier OP11, the switch SW2 connects the output of the amplifier OP11 to the non-inverting input of the differential amplifier OP31. When, on the other hand, the amplifier OP11 is connected to the signal generator 2, the switch SW2 then connects the output of the amplifier OP11 to the inverting input of the differential amplifier OP31. The output of the differential amplifier OP31 is connected to a smoothing stage SM1, which is advantageously constructed as an accurate-frequency and accurate-phase mean-value rectifier (synchronous demodulator). The smoothing stage SM1 is also driven by the clock generator Ti. It thus forms the mean value over a period T, that is to say over two half-periods, the output signal S1 having been processed in the first half-period and the output signal S2 having been processed in the second half-period. The waveform of $U_M$, which is proportional to the difference between S1 and S2, emerges from the drawing.

The output of the amplifier OP11 is connected to a further smoothing unit SM2, which operates in precisely the same way as the smoothing stage SM2. Hence, a signal proportional to the sum S1+S2 is available on the output of the smoothing stage SM2. Although this is not the sum but the arithmetic mean, this signal is proportional to the sum, apart from a proportionality factor. The output of the smoothing stage SM2 is connected to the controller C which, as also in FIG. 1, controls the gain of the amplifier OP11, specifically in such a way that the mean of S1 and S2 corresponds to the reference voltage $U_{REF}$.

In the configurations according to FIGS. 1 and 2, an analog signal is available on the output 3. Although in the configuration according to FIG. 2 this signal is resolved into time-discrete stages, in order to obtain a numerical value further measures are necessary.

FIG. 3 shows the possibility of obtaining a digital value directly from the output signals S1, S2. In a manner corresponding to the configuration of FIG. 1, the signal generator 1 is connected to an amplifier OP1 whose output is firstly connected to the non-inverting input of the differential amplifier OP3 and secondly to the adder OP4.

The signal generator 2 is connected to the amplifier OP2, whose output is connected to the inverting input of the differential amplifier OP3 and also to the adder OP4. Both amplifiers OP1, OP2 have the same gain V. Accordingly, the result on the output of the differential amplifier OP3 is a signal G (S1−S2), the factor G including the gain of the differential amplifier OP3. The result on the output of the adder OP4 is a signal H×(S1+S2). This signal is then fed to the reference input $U_{REF}$ of an analog/digital converter. The signal input analog in is connected to the output of the differential amplifier OP3. The result on the output 3 of the A/D converter is then a measured value $U_M$ in digital form.

Here, too, the difference S1−S2 is normalized to the sum S1+S2 of the output signals of the signal generators 1, 2, so that synchronous interference, for example in the light transmission or as a result of aging processes, is filtered out of the measured value.

Figure 4:
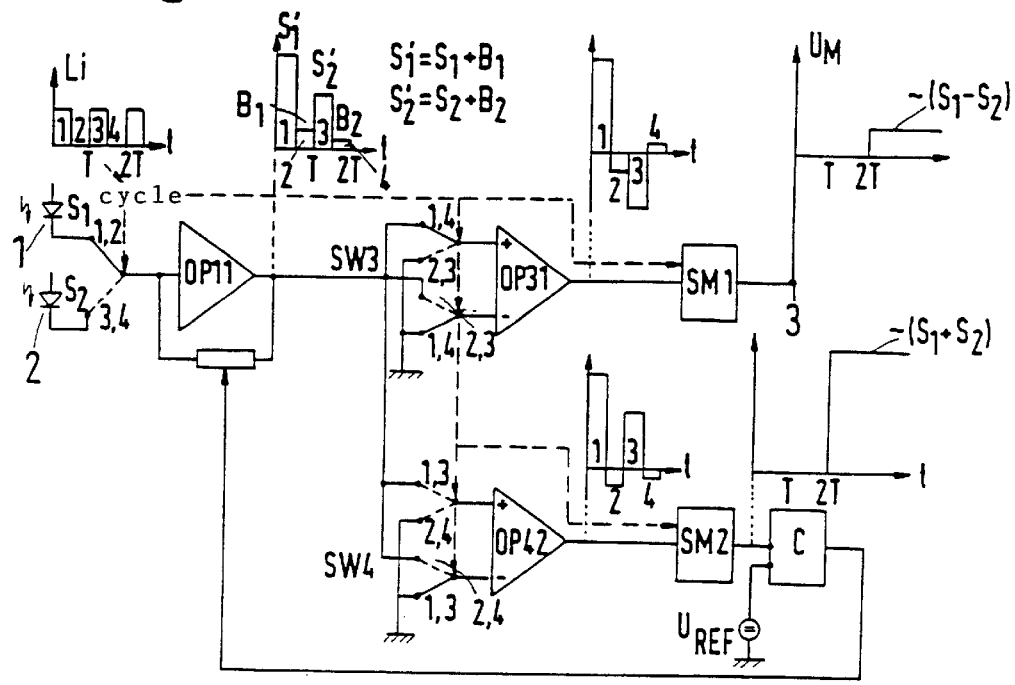
FIG. 4 shows a further configuration of a torque sensor as a modification of FIG. 2.

FIG. 4 shows a configuration which signifies an improvement by comparison with the configuration of FIG. 2. Identical parts are provided here with the same reference symbols. The signal waveforms at various points are likewise plotted.

Given the relative angular position of the measuring shaft start and measuring shaft end with the aid of light, there is a series of possible errors, for example dark currents, interfering light or amplifier errors. Accordingly, after passing through the amplifier OP11, the signals have errors. The erroneous signals S1', S2' are composed of error-free signals S1, S2 and an interference value B1 or B2, respectively.

In order to eliminate the interference values B1, B2, the light source Li is cycled, specifically at the period T and with the pulse duty factor 1:1. In order to simplify the explanation, it will be assumed that the light source is switched off completely in the second half of the period T. However, this is not absolutely necessary. In general form, it is sufficient if the light source radiates or transmits with a different intensity in the two halves of a period.

In the present case, the light period is T and the measuring period 2T. A switch arrangement SW3 is now connected upstream of the differential amplifier OP31. The output of the amplifier OP11 is also no longer connected to the smoothing stage SM2 directly, but via a circuit arrangement SW4 and a differential amplifier OP42.

The switch arrangements SW3 and SW4 are also controlled by the clock generator Ti (not specifically illustrated), which switches twice in one period T.

In order to simplify the explanation, a measuring period 2T is subdivided into four sections 1–4. The switch positions for the individual sections emerge from the drawing. In the first quarter, the signal generator S1 is connected via the amplifier OP11 to the non-inverting input of the differential amplifier OP31, and also to the non-inverting input of the differential amplifier OP42. The inverting input of the differential amplifiers OP31 and OP42 is connected to ground.

In the second quarter of the measuring period 2T, the first signal generator is still connected via the amplifier OP11 to the non-inverting input of the differential amplifier OP31. However, the output of the amplifier OP11 is now connected to the inverting input of the amplifier OP42. The other two inputs of the differential amplifiers OP31, OP42 are connected to ground. However, in this quarter the signal generator S1 does not output a useful signal but only an interference signal B1.

In the third and fourth quarters, the signal generator 2 is connected to the amplifier OP11, an error-affected signal S2' being evaluated in the third quarter, while in the fourth quarter only the interference signal B2 is evaluated. In the third quarter, the output of the amplifier OP11 goes correspondingly to the inverting input of the amplifier OP31 and to the non-inverting input of the amplifier OP42. In the fourth quarter, the relationships are reversed.

After one measuring period 2T, a measuring signal $U_M$ which is proportional to the difference S1−S2 is then available on the output 3. In addition, on account of the controller C, said signal is also normalized to the sum S1+S2, the two variables S1, S2 having been determined only from the useful signal.

Figure 5:
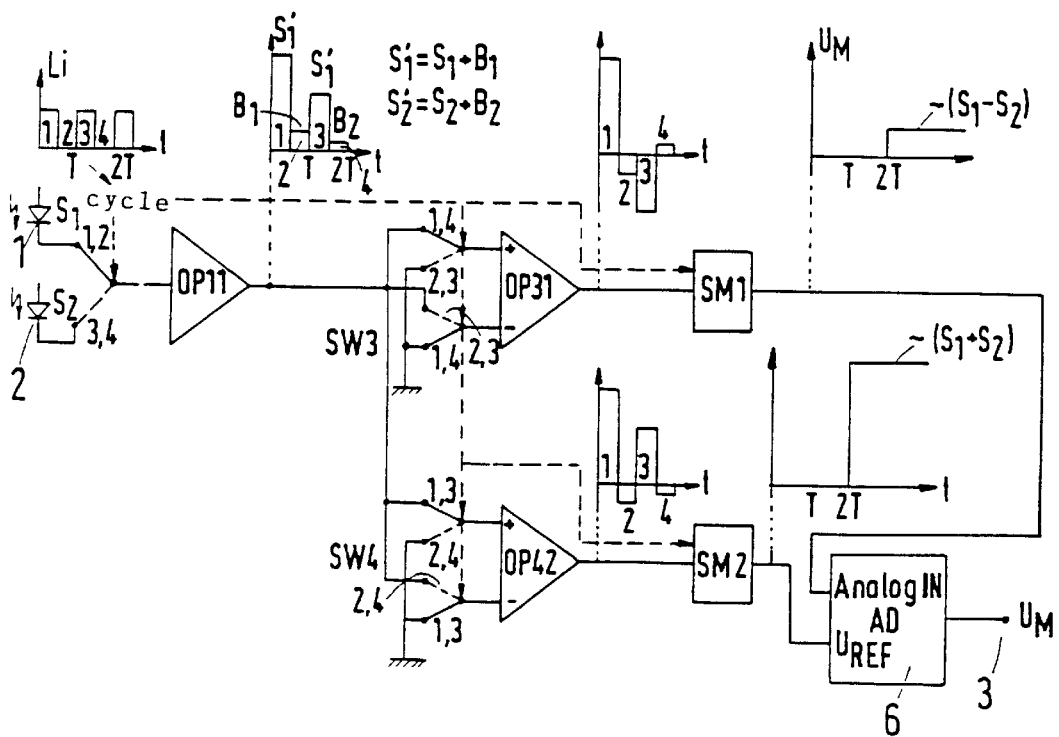
FIG. 5 shows a further configuration of a torque sensor corresponding to the illustration of FIG. 3.

In a corresponding way, FIG. 5 shows a development of FIG. 3. Parts identical to those in FIG. 4 are provided with the same reference symbols. The functioning as far as the output from the smoothing stages SM1, SM2 is also identical. However, here, as also in FIG. 3, the difference signal S1−S2 is led to the signal input analog in of the A/D converter, while the sum signal (S1+S2) is led to the reference input $U_{REF}$.

It is of course also possible for the configuration of FIG. 2 to be combined with the configuration of FIG. 3, that is to say in the configuration of FIG. 5 the switch arrangements SW3, SW4 and the differential amplifier OP42 are omitted.

It is also possible, in the configuration of FIG. 3, to fix a common gain for both amplifiers OP1, OP2, for example by means of suitable feedback measures, such as can be produced with a monolithic dual FET.

We claim:

1. A torque sensor comprising:
   a first signal generator having a first output signal that changes as a function of a torque;
   a second signal generator having a second output signal that changes in an opposite direction as a function of the torque;
   a difference-forming unit and a summing device, wherein the output signals of each signal generator are connected to inputs of corresponding first and second amplifiers whose respective gains are adjustable and the first and second amplified output signals are input to corresponding first and second inputs of the difference-forming unit and corresponding first and second inputs of the summing device, an output of the summing device providing a gain control signal.

2. The torque sensor as claimed in claim 1, wherein at least one of said first and second amplifiers receives a gain control signal.

3. The torque sensor as claimed in claim 2, wherein the gain controller is comprised of a monolithic dual FET.

4. The torque sensor according to claim 1, wherein the difference-forming unit is connected to a signal input and the summing device is connected to the reference input of an analog/digital converter.

5. The torque sensor as claimed in claim 1, wherein the signal generators are comprised of an opto-electronic structure including a light source and a light receiver, wherein the light source transmitted intensity varies cyclically and a switch that is controlled at a same cycle rate, feeds output signals of the signal generators to the summing device and the difference-forming unit.

6. The torque sensor as claimed in claim 5, wherein in each alternate cycle, the light source does not emit any light.

7. A torque sensor comprising:
   a first signal generator having an output signal that changes as a function of a torque;
   a second signal generator having an output signal that changes in an opposite direction as a function of the torque;
   a difference-forming unit and a summing device, wherein the output signals of each signal generator are connected to an input of a single amplifier, and
   wherein the amplifier is connected to the first and second signal generators via a switch, the summing device and the difference-forming unit processing consecutive input signals to form sum and difference signals respectively.

8. The torque sensor as claimed in claim 7, wherein the summing device and the difference-forming unit are further comprised of a smoothing element.

9. A method of producing a torque-dependent signal comprising the steps of:
   generating first and second output signals from first and second signal generators, amplifying the first and second output signals with corresponding first and second amplifiers;
   applying the amplified first and second output signals to corresponding first and second inputs of a difference unit and corresponding first and second inputs of a summing unit; and
   generating an amplifier control signal with the summing unit.

* * * * *